United States Patent [19]

Younes

[11] Patent Number: 4,634,731
[45] Date of Patent: Jan. 6, 1987

[54] FLAME-RETARDANT MOLDED COMPOSITION WHICH INCORPORATES A POLY(STYRENE-CO-MALEIC ANHYDRIDE-CO-DIBROMOSTYRENE) COPOLYMER

[75] Inventor: Usama E. Younes, Newtown Square, Pa.

[73] Assignee: Atlantic Richfield Company, Los Angeles, Calif.

[21] Appl. No.: 685,366

[22] Filed: Dec. 24, 1984

[51] Int. Cl.$^4$ .................. C08F 214/16; C08K 3/20; C08L 25/00
[52] U.S. Cl. ................... 524/502; 524/508; 524/517; 524/549; 525/186; 525/207; 526/271
[58] Field of Search ............... 526/271; 525/207, 186; 524/549, 508, 502, 517

[56] References Cited

U.S. PATENT DOCUMENTS 4,051,311 9/1977 Lee .................................. 526/271

Primary Examiner—Harry Wong, Jr.
Attorney, Agent, or Firm—Dennis M. Kozak

[57] ABSTRACT

A moldable composition which comprises a novel random bromostyrene-containing copolymer, thermoplastic resin, preferably polycarbonate and a flame retardant synergist is disclosed. The molded composition exhibits at least a 94 V-1 classification when tested in accordance with Underwriters Laboratories Inc. Test Method UL94.

4 Claims, No Drawings

FLAME-RETARDANT MOLDED COMPOSITION WHICH INCORPORATES A POLY(STYRENE-CO-MALEIC ANHYDRIDE-CO-DIBROMOSTYRENE) COPOLYMER

This invention relates to polymers.

In one of its more specific aspects, this invention relates to a moldable composition which, upon molding, exhibits excellent nonflammability properties.

The present invention provides a composition which comprises a random bromostyrene-containing copolymer, a flame retardant "synergist" and, optionally a thermoplastic resin such as, for example, polycarbonate. The composition, upon molding, exhibits at least a 94V-1 classification when tested in accordance with Underwriters' Laboratories Inc. Test Method UL 94.

According to this invention there is provided a moldable composition comprising a random copolymer comprised of the following recurring units:

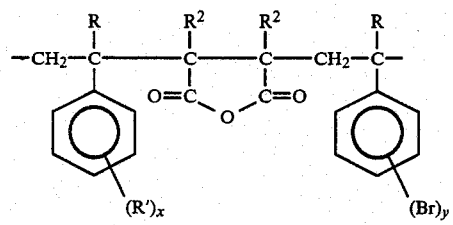

wherein each R separately represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, —OCH$_3$, —CO$_2$H, —CONH$_2$, or —CON(CH$_3$)$_2$; each R$^2$ separately represents —H or —CH$_3$; x represents an integer of from 0 to 3 and, y represents an integer of from 1 to 3; a flame-retardant synergist and a thermoplastic resin with the proviso that the random copolymer and the thermoplastic resin cannot be the same.

Also, according to this invention there is provided a method for producing a molded article which comprises (1) blending a random copolymer comprised of the following recurring units:

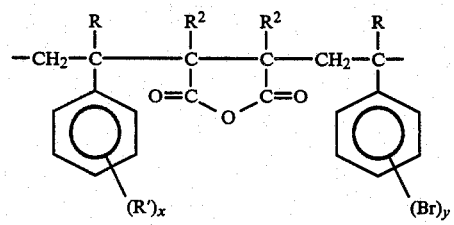

wherein each R separately represents —H, —CH$_3$, or —CH$_2$CH$_3$; R$^1$ represents —CH$_3$, —CH$_2$CH$_3$, —CH(CH$_3$)$_2$, —C(CH$_3$)$^3$, —OH, —OCH$_3$, —CO$_2$H, —CONH$_2$, or —CON(CH$_3$)$_2$; each R$^2$ separately represents —H or —CH$_3$; x represents an integer from 0 to 3 and wherein y represents an integer of from 1 to 3; a flame-retardant synergist; and a thermoplastic resin with the proviso that the random copolymer and the thermoplastic resin cannot be the same and, (2) molding the resulting blend.

According to this invention there is also provided a random copolymer comprised of the following recurring units:

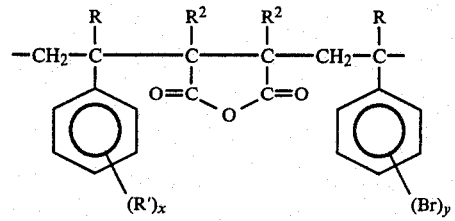

wherein each R separately represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, —OCH$_3$, —CO$_2$H, —CONH$_2$, or —CON(CH$_3$)$_2$; each R$^2$ separately represents —H or —CH$_3$; x represents an integer of from 0 to 3; and, wherein y represents an integer of from 1 to 3.

In another embodiment of this invention, the random copolymer can be foamed using any conventional method for foaming polymers such as, for example, extruding the random copolymer in contact with a conventional foaming agent or impregnating the copolymer with a foaming agent followed by heating the impregnated copolymer above its glass transition temperature.

In another preferred embodiment of this invention, the total amount of bromine in the random copolymer will be within the range of from about 2 to about 16 weight percent, preferably, it will be within the range of from about 3 to about 12 weight percent.

In another preferred embodiment of this invention the thermoplastic resin is a polycarbonate based on bisphenol having the general formula:

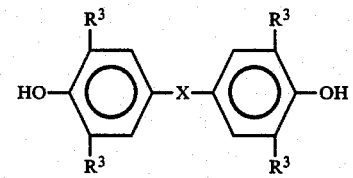

wherein each R$^3$ separately represent —H, a C$_1$ to C$_4$ alkyl group, Cl or Br and wherein X represents a direct bond C$_1$ to C$_8$ alkylene.

In another embodiment of this invention the random copolymer is poly(styrene-co-maleic anhydride-co-dibromostyrene).

In the practice of this invention, any suitable monomers can be employed to produce the first depicted recurring monomeric unit in the above general structure for the copolymer. Suitable monomers include: styrene, α-methylstyrene, α-ethylstyrene, methylstyrene, isopropylstyrene, t-butylstyrene, vinylbenzoic acid, vinyl phenol, vinyl analine, nitrostyrene, cyanostyrene, methoxystyrene, α-methyl-4-cyanostyrene, α-methyl-4-methylstyrene and the like, and their mixtures. Styrene is the preferred monomer. The random copolymer will comprise from about 5 to about 95 weight percent of recurring units of this monomer.

In the practice of this invention, any suitable monomers can be employed to produce the second recurring monomeric unit in the above general structure. Suitable monomers include: maleic anhydride, phenyl maleic anhydride, citraconic anhydride, itaconic anhydride, chloromaleic anhydride, bromomaleic anhydride and the like, and their mixtures. Maleic anhydride is most preferred. The random copolymer will comprise from about 1 to about 50 weight percent recurring units of this monomer.

In the practice of this invention, any suitable brominated styrene monomer can be employed as the third depicted recurring monomeric unit in the above general structure. Suitable bromostyrenes include: monobromostyrene, dibromostyrene, tribromostyrene α-methyl-2,4,6 tribromostyrene and their mixtures. The random copolymer will comprise from about 4 to about 94 weight percent recurring units of bromostyrene monomer.

One suitable brominated styrene is available from Great Lakes Chemical Corporation and is designated Great Lakes Dibromostyrene.

Great Lakes Dibromostyrene is a reactive monomer containing 61% aromatic bromine having the following general formula

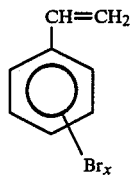

and exhibiting the following typical properties:

| | |
|---|---|
| appearance | light yellow liquid |
| density | 1.82 g/ml |
| boiling point | 95° C. (at 3 mm Hg) |
| assay, % | 99 + brominated styrenes |
| isomers | dibromo 80% |
| | monobromo 10% |
| | tribromo 10% |

Copolymers which are impact modified with rubbers are also suitable for use in this invention. Methods for chemically grafting the random copolymers of this invention to rubbers are well known. See for example, the method taught in Example I of U.S. Pat. No. 3,489,822, which method is incorporated herein by reference thereto.

If the random copolymer of this invention is used to produce molded articles the number average molecular weight of the copolymer should be at least 30,000, preferably it will be from about 80,000 to about 500,000.

To produce a moldable composition of this invention the random copolymer can be conventionally blended with any suitable flame-retardant synergist. The synergist will typically be employed in an amount within the range of from about 1 to about 10, preferably from about 1 to about 5 weight percent of the composition.

Suitable synergists include: antimony trioxide, antimony pentoxide, arsenic trioxide, arsenic pentoxide, zinc sulfate, zinc oxide, zinc borate, bismuth oxide, molybdenum oxide, tungsten oxide, stannous oxide and the like, and their mixtures. The preferred synergist is antimony trioxide.

Any suitable thermoplastic resin can be employed to produce moldable compositions of this invention. Suitable thermoplastic resins include styrene/maleic anhydride, styrene/acrylonitrile, polyphenylene oxide, styrene/N-phenylmaleimide, polyvinyl chloride, polycarbonate, polyamide, polyesters, polyacrylate, polysulfone and the like and their mixtures. Moreover, impact modified thermoplastic resins such a rubber modified styrene-maleic anhydride are also suitable for use.

Polycarbonates having the general formula depicted above are preferred and include 2,2-bis-(4-hydroxyphenyl)-propane; 2,2-bis(3-chloro-4-hydroxyphenyl)-propane, 2,2-bis-(3,5-dimethyl-4-hydroxyphenyl)propane; 2,4-bis(3,5-dimethyl-4-hydroxlphenyl)-2-methylbutane. Particularly suitable for use in the practice of this invention is 2,2-bis-(4-hydroxyphenyl)-propane.

The thermoplastic resin will typically be employed in an amount within the range of from about 5 to about 95 weight percent of the moldable composition, preferably, about 40 to about 60 weight percent.

Optionally, the molding composition can include other ingredients. Such as extenders, smoke suppressants, antioxidants, reinforcing fillers, processing aids, pigments, stabilizers, mold release agents and the like, for their conventionally employed purpose.

This invention is further demonstrated by the following examples.

EXAMPLE I

This example demonstrates the preparation of a copolymer of recurring units of styrene, maleic anhydride and dibromostyrene.

A one gallon reactor was charged with 1681 g of styrene, 405 g of dibromostyrene (Great Lakes Dibromostyrene) and 3.62 g of benzoyl peroxide. The reactor contents were heated to 80° C., at which time a solution of 248.4 g of maleic anhidrde in 1019 g of styrene was added over a three hour period. The polymerization was allowed to proceed for an additional 30 minutes.

The resulting copolymer was precipitated from methanol, filtered, washed with methanol and dried under vacuum. The copolymer was found to have a peak molecular weight of 191,000 and a weight average molecular weight of 291,000 when measured by GPC using polystyrene as a standard. The copolymer was found to exhibit a glass transition temperature of 157° C. by differential scanning calorimetry (DSC). Elemental analysis found 12.0% bromine and 18.2% maleic anhydride.

The resulting copolymer was dry blended with 4% antimony trioxide and 0.2% Irganox 1076 (stabilizer, Ciba-Geigy Corp.) extruded at 400° F. and injection molded. Gas chromotograph (GC) analysis of the polymer after injection molding showed a residual dibromostyrene content of about 0.175% after molding.

The molded composition was found to have the following properties:

| Property | ASTM | |
|---|---|---|
| DTUL (⅛", unannealed) | D-648 | 223° F. |
| Tensile Strength | D-638 | 7,100 psi |
| Flexural Strength | D-790 | 11,800 psi |
| Flexural Modulus | D-790 | 350,000 psi |
| Notched Izod | D-256 | 0.4 ft-lbs/in |
| Tg (DSC) | | 157° C. |

EXAMPLE II

This example demonstrates the preparation of a poly(styrene-co-maleic anhydride-co-dibromostyrene) copolymer.

A one-gallon reactor was charged with 1681 g of styrene, 282.5 g of dirbromostyrene (Great Lakes) and 3.53 g of benzoyl peroxide. The reactor contents were heated to 80° C. and a solution of 248.4 g of maleic anhydride in 1019 g of styrene was slowly added over a period of 2.5 hours. The polymerization was allowed to proceed for an additional 15 minutes after the addition.

The resulting polymer was precipitated from methanol, washed with methanol, and dried under vacuum. The copolymer was found to have a peak molecular weight of 186,000 and a weight average molecular weight of 250,000. Elemental analysis found 6.5% bromine and 18.2% maleic anhydride.

The resulting polymer was dry blended with 4% antimony trioxide and 0.2% of Irganox ®1076 (stabilizer), extruded and injection molded. Gas chromatography analysis of the polymer showed a residual dibromostyrene content of about 0.24% after molding. The molded composition was found to have the following properties. The ASTM test methods identified above were used.

| | |
|---|---|
| Tensile Strength | 7,400 psi |
| Flexural Strength | 13,800 psi |
| Flexural Modulus | 540,000 psi |
| Notched Izod | 0.4 ft-lbs/in |
| DTUL (⅛"unannealed) | 234° F. |

EXAMPLE III

This example demonstrates the preparation of a rubber modified poly(styrene-co-maleic anhydride-co-dibromostyrene) copolymer of this invention.

A four-liter, jacketed stainless steel reactor was used for the polymerization. The monomeric feed consisted of the following amounts of ingredients:

| | |
|---|---|
| 2200 g | Styrene |
| 99.4 g | Maleic Anhydride |
| 450 g | Dibromostyrene (Ethyl Corporation) |
| 237 g | Stereon ® 720 SBR-10% bound rubber (Firestone) |
| 0.36 g | Benzoyl Peroxide |
| 2.16 g | Irganox ® 1706 Stabilizer |
| 1.44 g | Polygard ® HR antioxidant (Uniroyal) |

The monomeric mixture was continuously fed into the top of the reactor at an average rate of 2.9 lb/hour (density of feed mixture=0.94 g/ml). The polymerization was carried out and the polymer syrup was collected through a dip tube from the bottom of the reactor. The resulting polymer was thinly spread on Mylar resin sheets and was allowed to air dry for 72 hours and for an additional 18 hours at 90° C., under reduced pressure. The resulting copolymer was finely ground using a Wiley Mill and was dried further for 120 hours at 90° C. and 18 hours at 120° C. Chemical analysis of the copolymer gave 5.6% maleic anhydride and 15% bromine by weight. The copolymer was tested and found to have an Mw of 171,200; and a glass transition temperature of 137° C. by DMA and 121° C. by DSC.

The resulting copolymer was dry blended with 4 weight percent antimony trioxide based on the weight of the copolymer plus the synergist, extruded and injection molded. The molded composition was found to have the following properties. The ASTM test methods identified above were used.

| | |
|---|---|
| Tensile Strength | 5,100 psi |
| Flexural Strength | 8,100 psi |
| Flexural Modulus | 320,000 psi |
| Notched Izod | 2.2 ft-lbs/in |
| DTUL (⅛", unannealed) | 191.3° F. |
| Specific Gravity | 1.18 |

EXAMPLE IV

About 45% by weight of the copolymer produced in Example 3 was melt blended at 550° F. with about 55% by weight of Mobay Merlon M-40 Polycarbonate (2,2-bis-(4-hydroxyphenyl)-propane) extruded and injection molded. The resulting molded blend was tested and found to have the following physical properties:

| | |
|---|---|
| Tensile Strength | 7,900 psi |
| Flexural Strength | 12,800 psi |
| Flexural Modulus | 353,000 psi |
| Notched Izod | 9.7 ft-lbs/in |
| Gardner Falling Wt.* | >320 in-lbs |
| DTUL (⅛", unannealed) | 232° F. |
| Tg DSC | 128, 143.5° C. |
| Tg DMA | 149° C. |

*½" diameter 8-lb weight and 1⅛" diameter orifice.

The molded blend was also tested for flammability in accordance with Underwriters Laboratories UL 94 Test Method (UL 94 Standard for Tests for Flammability of Plastic Materials For Parts in Devices and Appliances. UL 94, third edition Jan. 24, 1980).

In this UL 94 Vertical Burning Test, the molded blend test specimen was supported from the upper end, with the longest dimension vertical, by a clamp on a ring stand so that the lower end of the specimen was 1" above the top of the burner tube. The burner was then placed remote from the sample, ignited, and adjusted to produce a blue flame 1" in height. The test flame was placed centrally under the lower end of the test specimen and allowed to remain for 10 seconds. The test flame was then withdrawn, and the duration of flaming or glowing combustion of the specimen was noted. If flaming or glowing combustion of the specimen ceased within 30 seconds after removal of the test flame, the test flame was again placed under the specimen for 10 seconds immediately after flaming or glowing combustion of the specimen stopped. The test flame was again withdrawn, and the duration of flaming or glowing combustion of the specimen was noted. If the specimen dripped flaming particles or droplets while burning in this test, these drippings were allowed to fall onto a horizontal layer of cotton fibers (untreated surgical cotton) placed one foot below the test specimen. Significantly flaming particles were considered to be those capable of igniting the cotton fibers. The duration of flaming or glowing combustion of vertical specimens after application of the test flame (average of 5 specimens with 10 flame applications) should not exceed 25 seconds (maximum not more than 30 seconds) and the portion of the specimen outside the clamp should not be completely burned in the test.

Materials which comply with the above requirements and do not drip any flaming particles or droplets during the burning test are classified as "V-1". Materials which comply with the above requirement but drip flaming particles or droplets which burned briefly during the test are classified as "V-2". A "V-0" rating is given to materials wherein the duration of flaming or glowing combustion averages less than 5 seconds under the conditions specified above.

The results of the UL 94 testing was as follows:

| Molded Blend of | UL 94 (5" × ½" × 1/16" bar) |
| --- | --- |
| Example 4 | V-0 |

It will be evident from the foregoing that various modifications can be made to this invention. Such, however, are considered as being within the scope of the invention.

What is claimed is:

1. A moldable composition comprising a random copolymer comprised of the following recurring units:

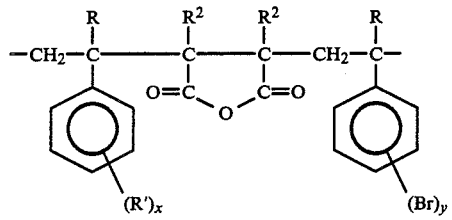

wherein each R separately represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, OCH$_3$, —CO$_2$H, —CONH$_2$, or —CON(CH$_3$)$_2$; each R$^2$ separately represents —H or —CH$_3$; x represents an integer of from 0 to 3 and, y represents an integer of from 1 to 3 and wherein said random copolymer contains in weight percent from about 5 to about 95 of the first depicted recurring unit

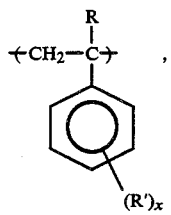

from about 1 to about 50 of the second depicted recurring unit

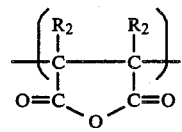

and from about 4 to about 94 of the third depicted recurring unit

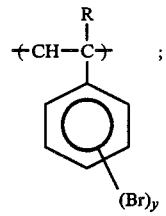

a flame-retardant synergist; and, a thermoplastic resin, with the proviso that the random copolymer and the thermoplastic resin cannot be the same.

2. The moldable composition of claim 1 in which said thermoplastic resin is a polycarbonate based on bisphenol having the general formula:

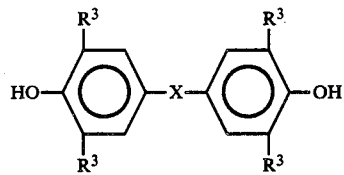

wherein each R$^3$ separately represents —H, a C$_1$ to C$_4$ alkyl group, Cl, or Br and wherein X represents a direct bond C$_1$ to C$_8$ alkylene.

3. The moldable composition of claim 1 in which said flame-retardant synergist is present in an amount within the range of from about 1 to about 10 weight percent of the total weight of the composition.

4. The moldable composition of claim 1 in which said flame-retardant synergist is present in an amount within the range of from about 1 to about 5 weight percent of the total weight of the composition.

* * * * *